United States Patent Office 3,692,534
Patented Sept. 19, 1972

3,692,534
METHOD OF THE PRESERVATION OF FOOD AGAINST PUTREFACTION
Ryuzo Ueno, Nishinomiya-shi, Tetsuya Miyazaki, Itami-shi, and Shigeo Inamine, Nishinomiya-shi, Japan, assignors to Ueno Pharmaceutical Co., Ltd., Osaka, Japan
No Drawing. Filed Nov. 20, 1969, Ser. No. 878,528
Int. Cl. A21d 2/14; A23l 3/34
U.S. Cl. 99—90 P
4 Claims

ABSTRACT OF THE DISCLOSURE

A method of preserving food which must be cooked against putrefaction which comprises adding to the starting materials of a food product granules of a size of less than 500μ comprising powder of a pH lowering agent coated with a hardened oil having a melting point of 50 to 80° C., the pH lowering agent being selected from the group consisting of fumaric acid, monosodium fumarate, tartaric acid, malic acid and citric anhydride, and being contained in the granules in an amount of 25 to 40% by weight, together with a powder of an organic acid type food preservative selected from the group consisting of sorbic acid, potassium sorbate, calcium propionate and sodium propionate.

---

This invention relates to a method of preserving food against putrefaction. More specifically, it relates to an improved method of preserving food against putrefaction in which activities of organic acid type food preservatives can be fully exhibited.

It has been known that activities of organic acid type food preservatives, namely, sorbic acid, potassium sorbate, calcium propionate and sodium propionate are greatly influenced by the pH. The reason is considered to be that the preservative activities of these food preservatives are mainly due to non-dissociated molecules in foods. In other words, as the pH is on a more acidic side, the number of non-dissociated molecules increases and the preservative activities are enhanced. Accordingly, in case organic acid type preservatives are used for the preservation of food against putrefaction, it is desired that the pH of food is lowered as much as possible within such a range as will not impose bad influences to the quality of the food. The pH values preferable for the activities of organic acid type food preservatives are generally in the range of 4.5 to 5.5, though they vary depending on the class of the food preservative to some extent. In the case of a food preservative of a high dissociation constant, the pH must be lowered as much as possible. In the case of a food preservative of a low dissociation constant, its preservative activity is expected at a relatively high pH.

In some food products, however, the lowering of the pH of the starting materials during the manufacturing thereof adversely influences the qualities of the products. For instance, in the manufacture of fish products such as fish sausage and meat products such as meat sausage, the lowering of the pH of the starting meat emulsion to increase the activity of an organic acid foor preservative results in decrease of the water retainability of the meat, with the consequence that adverse effects appear with respect to the elasticity of the end product prepared from such meat emulsion. Generally, the water retainability of meat is lowest at a pH of approximately 5.5, and when the pH becomes higher than this value, the water retainability increases. Accordingly, a higher pH is preferable with respect to the water retainability of meat.

Further, in the case of bread manufactured by yeast fermentation the lowering of the pH is not desired because the propagation of yeast is hindered by the increase of the activity of a food preservative and adverse effects are imposed on the fermentation of yeast, resulting in the formation of bread products with poor rising properties.

As described above, in some food products the condition for enhancing preservative effects is contradictory to the condition for maintaining the quality of the products.

It is therefore a primary object of this invention to provide a method of preserving food against putrefaction in which the above mentioned contradictory conditions can be satisfied at the same time. This object of the invention is attained by adding to the starting materials of a food product granules comprising a pH lowering agent coated with a hardened oil in a manner such that the pH lowering agent will not be eluted during the manufacturing step conducted at room temperature but eluted during the heating step, together with a food preservative.

More specifically, in accordance with this invention powder of a pH lowering agent selected from the group consisting of fumaric acid, monosodium fumarate, tartaric acid, malic acid and citric anhydride is coated with a hardened oil having a melting point of 50 to 80° C. to form granules having a particle size of less than 500μ in which the content of the powder is 25 to 40% by weight, and the so formed granule is added to the starting materials of the food products together with an organic acid type food preservative. Any of known organic acid type food preservatives such as sorbic acid, potassium sorbate, calcium propionate and sodium propionate may be optionally used in this invention.

The coating may be performed by various methods. For instance, a method comprising charging a molten hardened oil into a strong kneader, then adding thereto a nuclear substance, i.e., a pH lowering agent such as fumaric acid, gradually cooling the system to room temperature while mixing to thereby form a granules of a diameter of 0.5 to 3 mm., and pulverizing them to less than 1 mm., and a method comprising charging the above mentioned nuclear substance into a coating pan, spraying thereto a solution of a hardened oil in a volatile solvent and then removing the solvent by blowing in hot air may be cited. A coating method most suitable for this invention is a spray granulation method which will be described below. In accordance with this method it is possible to easily obtain granules having a particles size of less than 500μ in which the content of powder uncoated with a hardened oil is extremely low.

A hardened oil having a melting point of 50 to 80° C. is melted by heating, and a nuclear substance (namely, the above mentioned pH lowering agent pulverized to less than 50μ is dispersed in the molten hardened oil. At this time the dispersion state is rendered better by addition of lecithin in an amount of about 0.1% based on the hardened oil. The so formed dispersion maintained at a temperature higher than the melting point of the hardened oil is sprayed into air of less than 40° C. by means of a rotary disc sprayer, and thus cooled and solidified. As a result granules comprising the nuclear substance, the surface of which is coated with the hardened oil, are obtained. The so obtained granules have a particle size of less than 500μ and a uniform spherical configuration. The particle size of the granules can be easily and optionally controlled by adjusting the rotation rate of the rotary disc.

The content of the nuclear substance in the coated granules of this invention is up to 40% (namely, the upper limit of the ratio of the nuclear substance to the hardened oil is 40/60). The reason is that when the content of the nuclear substance is too high, the dispersion becomes highly viscous and the spraying thereof becomes difficult. A preferable content of the nuclear agent is about 35% (the nuclear substance-to-hardened oil ratio of about 35/65). When the content of the hardened oil is too high, the cost per unit weight of the nuclear substance is increased, though no operational disadvantage is brought about. Therefore, too high a content of the hardened oil is not preferable. Further although the coating state is improved when the content of the hardened oil is high, a significant improvement is not observed when the content of the hardened oil is made higher than 75%. Thus, a preferable ratio of the nuclear substance to the hardened oil is within a range of from 25/75 to 40/60, especially from 25/75 to 35/65.

In this invention the coating state is evaluated based on the determination of the amount of the uncoated nuclear substance contained in the resulting granule. More specifically, 1 gram of the granules is added to 100 g. of water of room temperature and the mixture is agitated for 10 minutes by means of a magnetic stirrer, followed by filtration. The amount of the nuclear substance in the filtrate is determined and expressed in terms of percent based on the nuclear substance in the sample granules. When the nuclear substance in the filtrate is an acid, the titration is conducted with the use of 0.1 N NaOH, and when the nuclear substance in the filtrate is a salt, it is converted to the corresponding free acid by an ion exchange resin and then the titration is conducted with the use of 0.1 N NaOH. As a result of such measurements, it was confirmed that amount of uncoated nuclear substance in the granules of this invention is less than about 5% when the nuclear substance is fumaric acid, about 10% in the case of sorbic acid, about 20% in the case of the propionate, and 15 to 20% in the case of other pH lowering agents. In the actual operation these values are negligible, and hence it can be said that the coating state according to this invention is very good.

The methods of coating nuclear substances and of the preservation of food with the use of the resulting granules will now be described detailedly by referring to examples.

EXAMPLE 1

Hardened beef tallow having a melting point of 59° C. is melted by heating, and 0.1% of the lecithin is added thereto to obtain 6.5 kg. of the mixture of hardened beef tallow and lecithin. While the mixture is maintained at 70° C., 3.5 kg. of fumaric acid comminuted to an average particle diameter of less than 20μ is added thereto. Then, the mixture is sufficiently stirred by a homogenizer to disperse fumaric acid uniformly. While the dispersion is maintained at 70° C., it is sprayed into the air of 35° C. by means of a rotary disc sprayer, and then cooled and solidified. As a result, granules having a particle size of 300 to 50μ are obtained.

EXAMPLE 2

Similar granules to those obtained in Example 1 are prepared by using tartaric acid instead of fumaric acid.

EXAMPLE 3

Similar granules to those obtained in Example 1 are prepared by using malic acid instead of fumaric acid and changing the malic acid/hardened oil ratio to 25/75.

EXAMPLE 4

Granules similar to those obtained in Example 3 are prepared by using citric anhydride instead of malic acid.

EXAMPLE 5

Granules similar to those obtained in Example 3 are prepared by using monosodium fumarate instead of malic acid.

EXAMPLE 6

A starting material meat for preparing Vienna sausage comprising 1,400 grams (70% by weight) of pork and 600 grams (30% by weight) of beef is cured for 24 hours, then passed through a chopper and kneaded for a while by using a silent cutter. To this material mixture are then added such auxiliary materials as condiments and spices together with a perspective (and a pH lowering agent) indicated in Table 1 below. Then, the mixture is kneaded for 5 minutes, and is stuffed into a sheep intestine casing. The casing is used as it is washed with water and is not subjected to a special treatment. Then, the material mixture stuffed into the sheep intestine is dried at 40° C. for one hour, smoked at 50° C. for 30 minutes, then boiled at 70° C. for 20 minutes and cooled. After the preparation of sausage is completed, it is stored in a refrigerator for about 20 hours, and then allowed to stand in a constant temperature-constant humidity apparatus at a temperature of 25° C. and a relative humidity of 85%.

The results of the tests with respect to the pH, product quality and preservative effect are shown in Table 1.

TABLE 1

| Preservative | Amount of preservative added based on material meat (wt. percent) | pH [1] Before heating | pH [1] After heating | Quality of product [2] | Preservative test |
|---|---|---|---|---|---|
| Coated fumaric acid granule [3] | 0.3 | 6.30 | 5.80 | Soft and elastic jelly (good) | Spoiled after 96 hours. |
| Potassium sorbate | 0.2 | | | | |
| Potassium sorbate | 0.2 | 5.85 | 5.78 | Hard and easily broken | Do. |
| Fumaric acid | 0.09 | | | | |
| Potassium sorbate | 0.2 | 6.40 | 6.45 | Soft and elastic jelly (good) | Spoiled after 65 hours. |
| Not added | | 6.35 | 6.40 | do | Spoiled after 48 hours. |

[1] Fumaric acid content is 30%.
[2] The specimen is suspended in distilled water of a volume 5 times as large as that of the specimen and the pH is measured with a glass electrode pH meter.
[3] The specimen was actually eaten and a sensory evaluation is made.

As can be seen from the results shown in the above table, when the coated fumaric acid granules are used together with potassium sorbate in accordance with this invention, the preservative effect is remarkably enhanced with no adverse effect on the quality of the product.

EXAMPLE 7

To 4 kg. of wheat flour are added 55% based on the weight of the flour of water, 6% of sugar, 4% of bread yeast, 4% of shortening oil, 0.1% of a fermentation promoter and a preservative (together with a pH lowering agent) indicated in Table 2 below. The material mixture is kneaded for 10 minutes by means of a great mixer.

Then, the resulting dough is allowed to stand in a chamber maintained at 30° C. for 10 minutes and divided into blocks each weighing 150 g. Thereafter, the blocks are allowed to stand at 30° C. for 10 minutes and placed in a rectangular bread mold. Then, they are allowed to stand at 30° C. for 10 minutes and dried for 30 minutes in a steam kettle maintained at 38° C. Thereafter, the baking is carried out for 20 minutes in an electric oven maintained at 210° C. The resulting bread product is allowed to be cooled for 14 hours. Then, 10 loaves are subjected to the sensory evaluation test and 8 loaves are used for the volume measurement, the pH measurement and the hardness measurement by a Vegard's compression meter. Further, each of 12 loaves is broken in two in the middle, and each of the resulting 24 cuts is put in a polyethylene bag and allowed to stand in a thermostat maintained at 30° C. Thus, the deterioration by mold and the like is observed for days.

As the fermentation promoter there is used a mixture consisting of 2.4% of ascorbic acid, 2.9% of potassium bromate, 18.6% of an enzyme activator, 20.7% of calcium sulfate and 56.1 % of starch.

When the coated fumaric acid granules are used as the pH lowering agent, the pH of the dough is not decreased but the pH of the bread is rather lowered. When fumaric acid or lactic acid is used, the volume of the bread is very small. On the other hand, when the coated fumaric acid granule is used, the volume of the bread is comparable to that of the control product. When fumaric acid or lactic acid is used, the bread shows a remarkable crumb hardness. On the other hand, when the coated granules are used, the bread products show a softness comparable to that of the control bread, and these results of the hardness tests are in accord with the results of the sensory test conducted on the hardness. The results of the pH, hardness, volume and sensory tests are shown in Table 2 below.

TABLE 2

| Sample | pH Dough | pH Product | Volume (ml.) | Crumb hardness (g.) | Sensory test (hardness) |
|---|---|---|---|---|---|
| Control (not added) | 5.72 | 5.60 | 565 | 80.0 | Ordinary. |
| Calcium propionate (0.1%) | 5.75 | 5.65 | 452 | 80.6 | Do. |
| Calcium propionate (0.1%) 50% lactic acid (0.1%) | 5.36 | 5.25 | 428 | 98.9 | Rather hard. |
| Calcium propionate (0.1%) Fumaric acid (0.03%) | 5.38 | 5.28 | 420 | 101.2 | Do. |
| Calcium propionate (0.1%) Coated fumaric acid granule (0.1%) | 5.68 | 5.28 | 450 | 81.8 | Ordinary. |

The results of the preservative test are shown in Table 3 below. As is apparent from the results shown in the table, although the single use of 0.1% of calcium propionate does not give a sufficient preesrvative effect, the conjoint use of the coated fumaric acid granule can prolong the storage period. In the table, the numerical value of the numerator shows the number of bread samples where the growth of mold is observed, and the numerical value of the denomination shows the total number of samples to be tested.

TABLE 3

| Sample | Storage period after— | | | | |
|---|---|---|---|---|---|
| | 1 day | 2 days | 3 days | 4 days | 5 days |
| Control (not added) | 0/24 | 18/24 | 24/24 | | |
| Calcium propionate (0.1%) | 0/24 | 8/24 | 22/24 | 24/24 | |
| Calcium propionate (0.1%) 50% lactic acid (0.1%) | 0/24 | 1/24 | 8/24 | 19/24 | 24/24 |
| Calcium propionate (0.1%) Coated fumaric acid granule (0.1%) | 0/24 | 2/24 | 6/24 | 19/24 | 24/24 |

We claim:

1. A method of preserving a food product which must be cooked selected from uncooked meat, uncooked fish and bread dough against putrefaction which comprises adding to the starting materials of said food product (1) granules of a size of less than 500μ, said granules comprising a powder of a pH lowering agent coated with a hardened oil having a melting point of 50 to 80° C., said pH lowering agent being selected from the group consisting of fumaric acid, monosodium fumarate, tartaric acid, malic acid and citric anhydride, said pH lowering agent being contained in said granules in an amount of 25 to 40% by weight, and (2) a powder of an uncoated organic acid type food preservative selected from the group consisting of sorbic acid, potassium sorbate, calcium propionate and sodium propionate, said granules (1) being added in an amount to give the desired pH to the cooked food product and said powder (2) being added in an amount necessary to render the food product innoculous.

2. The method of claim 1, wherein the food product is meat sausage.

3. The method of claim 1, wherein the food product is fish sausage.

4. The method of claim 1, wherein the food product is bread made by the yeast fermentation.

References Cited
UNITED STATES PATENTS 3,038,810  6/1962  Akerboom et al. ---- 99—150 R
2,997,394  8/1961  Melnick et al. ---- 99—150 R X RAYMOND N. JONES, Primary Examiner
J. R. HOFFMAN, Assistant Examiner U.S. Cl. X.R.
99—150 R, 157, 158